(12) United States Patent
Strimpel

(10) Patent No.: US 10,983,770 B2
(45) Date of Patent: *Apr. 20, 2021

(54) EFFICIENT BUNDLING AND DELIVERY OF CLIENT-SIDE SCRIPTS

(71) Applicant: ServiceNow, Inc., Santa Clara, CA (US)

(72) Inventor: Jason Strimpel, San Diego, CA (US)

(73) Assignee: ServiceNow, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/896,880

(22) Filed: Jun. 9, 2020

(65) Prior Publication Data

US 2020/0301682 A1    Sep. 24, 2020

Related U.S. Application Data

(63) Continuation of application No. 16/184,625, filed on Nov. 8, 2018, now Pat. No. 10,713,020.

(51) Int. Cl.
*G06F 9/44* (2018.01)
*G06F 8/41* (2018.01)
*G06F 8/71* (2018.01)

(52) U.S. Cl.
CPC ............. *G06F 8/433* (2013.01); *G06F 8/71* (2013.01)

(58) Field of Classification Search
CPC ........................................................ G06F 8/433
USPC ........................................................ 717/155
See application file for complete search history.

(56) References Cited

U.S. PATENT DOCUMENTS

| 6,321,229 | B1 | 11/2001 | Goldman |
| 6,678,887 | B1 | 1/2004 | Hallman |
| 8,151,261 | B2 | 4/2012 | Sirota |
| 8,255,362 | B2 | 8/2012 | Johnson et al. |
| 8,493,386 | B2 * | 7/2013 | Burch ............... G06F 3/04815 345/419 |
| 8,507,867 | B1 | 8/2013 | Clement |
| 8,646,093 | B2 | 2/2014 | Myers |

(Continued)

OTHER PUBLICATIONS

"Web Components", printed from http://developer.mozilla.org/en-US/docs/Web/Web_Components on Apr. 25, 2018.

(Continued)

*Primary Examiner* — Evral E Bodden
(74) *Attorney, Agent, or Firm* — Fletcher Yoder PC

(57) ABSTRACT

A computing system may include a computing device configured to build modules of script code into bundles, and a bundler application executable to perform operations comprising: obtaining one or more of the modules of script code that are designated for bundling with one another; organizing the modules of script code into one or more chunks; for each respective chunk of the one or more chunks: (i) determining whether the respective chunk is to be assigned a deterministic chunk identifier or a non-deterministic chunk identifier, and (ii) assigning the respective chunk a chunk identifier as determined, where deterministic chunk identifiers are usable for referencing by additional modules of script code both within and not within in the respective chunk, and where the deterministic chunk identifiers are independent of characteristics of the computing device; and writing the one or more chunks to a bundle.

20 Claims, 14 Drawing Sheets

(56) References Cited

U.S. PATENT DOCUMENTS

| | | | |
|---|---|---|---|
| 8,983,982 B2 | 3/2015 | Rangarajan | |
| 9,052,914 B2 | 6/2015 | Kieffer | |
| 9,508,051 B2 | 11/2016 | Falk | |
| 9,535,674 B2 | 1/2017 | Cooper | |
| 9,557,969 B2 | 1/2017 | Sharma | |
| 2005/0273758 A1 | 12/2005 | Long | |
| 2006/0282480 A1* | 12/2006 | Johnson | G06F 8/61 |
| 2008/0034071 A1 | 2/2008 | Wilkinson | |
| 2011/0107326 A1 | 5/2011 | Dehaan | |
| 2012/0066586 A1 | 3/2012 | Shemesh | |
| 2013/0041900 A1* | 2/2013 | McCoy | G06F 16/20 707/737 |
| 2015/0019688 A1 | 1/2015 | Scoda | |
| 2018/0275976 A1* | 9/2018 | Edler Von Koch | G06F 8/54 |

OTHER PUBLICATIONS

"Webpack", printed from https://en.wikipedia.org/wili/Webpack on Oct. 18, 2018.

"A Beginner's Guide to Webpack 4 and Module Bundling", printed from https://www.sitepoint.com/beginners-guide-webpack-module-bundling/on Oct. 18, 2018.

"Modern approach of JavaScript bundling with Webpack", printed from https://medium.com/@andrejsabrickis/modern-approach-of-javascript-bundling-with-webpack-3b7b3e5f4e7 on Oct. 18, 2018.

"Webpack 4 in production: How to make your life easier", printed from https://medium.com/@hpux/webpack-4-in-production-how-make-your-life-easier-4d03e2e35b081 on Oct. 18, 2018.

"Concepts", printed from https://webpack.js.org/concepts/ on Oct. 18, 2018.

Wagner et al.: "reduce JavaScript paylads with code splitting | Web Fundamentals", Sep. 19, 2018, XP055672268; [iretrived from the internet on Feb. 28, 2020—https://webcache.googleusercontent.com/search?q=cache:AOUr7QZBK9QJ:https://developers.google.com/web/fundamentals/performance/optimizing-haaascript/code-splitting+&cd=6&hl=en&ct-clnk&gl=de&client=firevox.b.ab].

Anonymous: "How code-splitting-works", Nov. 6, 2018, XP0055671944; [retrived from the internet Feb. 27, 2020—https://github.com/gatsbyjs/gatsby/blob/178fd9492aa5d5cr1334d502e8c5b3f5c0862c51/docs/docs/how-code-splitting-works.md].

* cited by examiner

EFFICIENT BUNDLING AND DELIVERY OF CLIENT-SIDE SCRIPTS

CROSS REFERENCE TO RELATED APPLICATION

This application is a continuation of U.S. Non-Provisional application Ser. No. 16/184,625, entitled "EFFICIENT BUNDLING AND DELIVERY OF CLIENT-SIDE SCRIPTS," filed on Nov. 8, 2018, which issued as U.S. Pat. No. 10,713,020 on Jul. 14, 2020, and which is herein incorporated by reference in its entirety for all purposes.

BACKGROUND

As the use of web technologies continue to grow, web pages have become more dynamic. Now, rather than delivering content in just the form of markup language, such as the Hypertext Markup Language (HTML), web pages can include references to scripts within the markup language. The references may take the form of uniform resource locators (URLs), and the scripts may be implemented in JavaScript, for example. In some cases, dynamic web pages may be referred to as web applications, as they contain a significant amount of executable code.

Large and/or intricate web applications may include dozens of such references to scripts, and these scripts may be complex. In order for a web application to be fully executable, each of these scripts is downloaded to the web client (e.g., transmitted from the web server to a client device executing the web client). These transmissions can increase the overall time it takes for the web application to be loaded and rendered.

In particular, a script referenced in the markup language may depend on one or more additional, underlying scripts that might not be directly or explicitly referenced in the markup language. Thus, these underlying scripts are also downloaded to the web client. Furthermore, multiple scripts may depend on the same underlying scripts. When the scripts used in a web application are independently developed and bundled with their underlying dependencies in a distributed fashion (which is a desirable scenario for large-scale web application development), this can result in multiple copies of these underlying scripts being downloaded to the web client.

Current script bundling mechanisms fail to address these and other issues in an efficient fashion. As a consequence, the deployment of rich web applications can result in a slow and non-satisfactory user experience.

SUMMARY

The embodiments herein solve technical problems related to building bundles (packages) of script code modules for deployment to a web client as a web component (e.g., a graphical user interface widget and some of its functionality). A web application may employ a number of web components that can be combined in various ways. Currently, bundler applications assume that all of the dependencies between modules used by the web application are known ahead of time, and accordingly build one or more bundles under this assumption. These bundles are then transmitted to the web client at run time.

But in many development environments, especially for large-scale and/or complex web applications, multiple developers or teams combine their efforts. For instance, different software developers across various locations may be responsible for various web components. Thus, it is desirable for these developers to be able to work independently of one another when carrying out this development. As a result, the full extent of dependencies between the modules that make up these web components might not be known to any one developer.

Each web component may depend on certain common modules, e.g., libraries, for basic functionality. A goal is to bundle web components and with their respective dependencies so that the web components can be individually deployed. Thus, these common modules are often bundled with some or all of the web components. As a result, two or more redundant copies of the same common modules may be transmitted to the web client. Since some common modules can be quite large (e.g., on the order of 75 kilobytes or more), these redundancies can use additional memory at both the web server and the web client, use network capacity when transmitted to the web client, and slow the operation and rendering of the web application.

The embodiments herein avoid these inefficiencies by having the bundler application assign unique and deterministic identifiers to modules of script code and/or groups (chunks) of these modules. Since the identifiers are the same for all developers, they will be consistent across web components, even if the web components were developed independently from one another. Thus, web components developed in this fashion can refer to common modules, but only one copy of each common module needs to be transmitted to the web client at run time. As a result, memory space, network capacity, and processor utilization are reduced.

Accordingly, a first example embodiment may involve a computing system and a bundler application. The computing system may include a computing device configured to build modules of script code into bundles, where the computing device comprises one or more processors and memory. The bundler application may be stored in the memory and configured to be executed by the one or more processors. Execution of the bundler application may cause the bundler application to perform operations comprising: obtaining one or more of the modules of script code that are designated for bundling with one another; based on dependencies between the modules of script code, organizing the modules of script code into one or more chunks; for each respective chunk of the one or more chunks: (i) determining whether the respective chunk is to be assigned a deterministic chunk identifier or a non-deterministic chunk identifier, and (ii) assigning the respective chunk a chunk identifier as determined, where deterministic chunk identifiers are usable for referencing by additional modules of script code both within and not within in the respective chunk, and where the deterministic chunk identifiers are independent of characteristics of the computing device; and writing, in the memory, the one or more chunks to a bundle.

A second example embodiment may involve obtaining, by a bundler application executing on a computing device, one or more modules of script code that are designated for bundling with one another. The second example embodiment may further involve, possibly based on dependencies between the modules of script code, organizing, by the bundler application, the modules of script code into one or more chunks. The second example embodiment may further involve, for each respective chunk of the one or more chunks, the bundler application: (i) determining whether the respective chunk is to be assigned a deterministic chunk identifier or a non-deterministic chunk identifier, and (ii) assigning the respective chunk a chunk identifier as determined, where deterministic chunk identifiers are usable for referencing by additional modules of script code both within and not within in the respective chunk, and where the deterministic chunk identifiers are independent of characteristics of the computing device. The second example embodiment may further involve writing, by the bundler application, the one or more chunks to a bundle.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
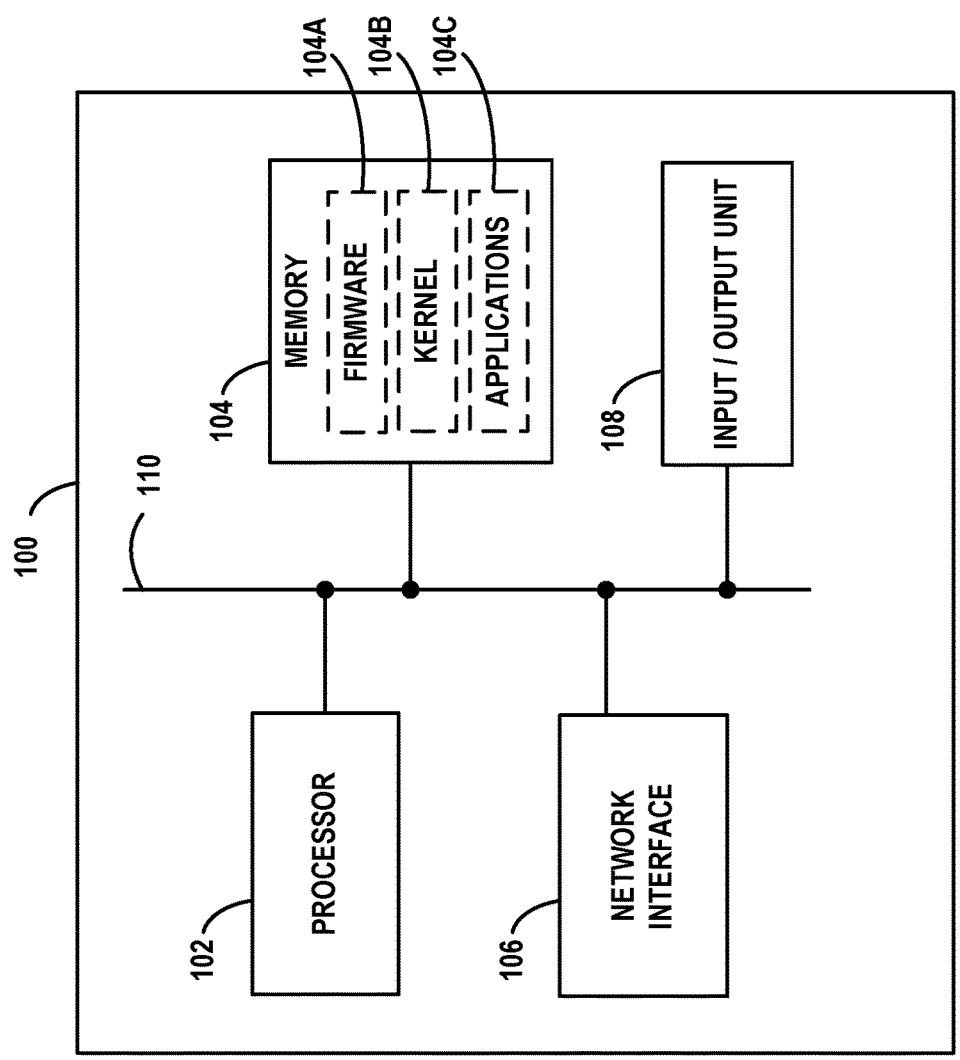
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-on boarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
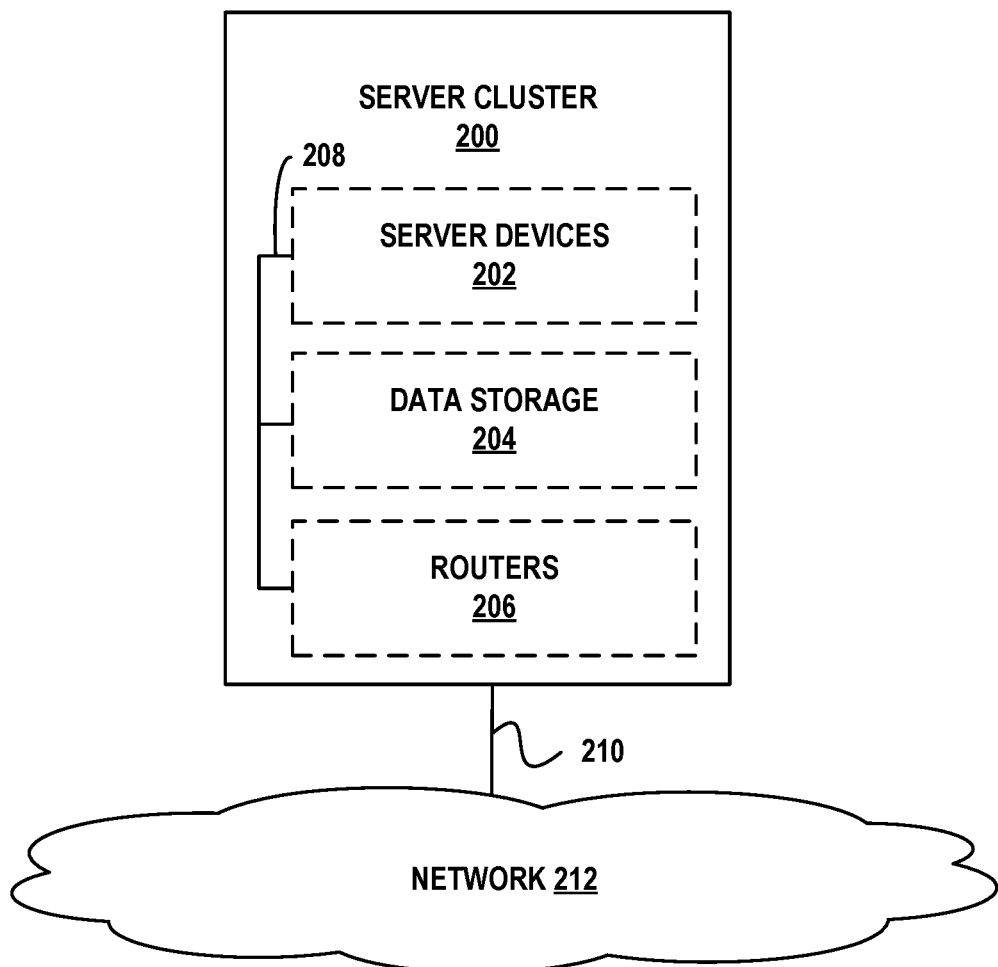
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
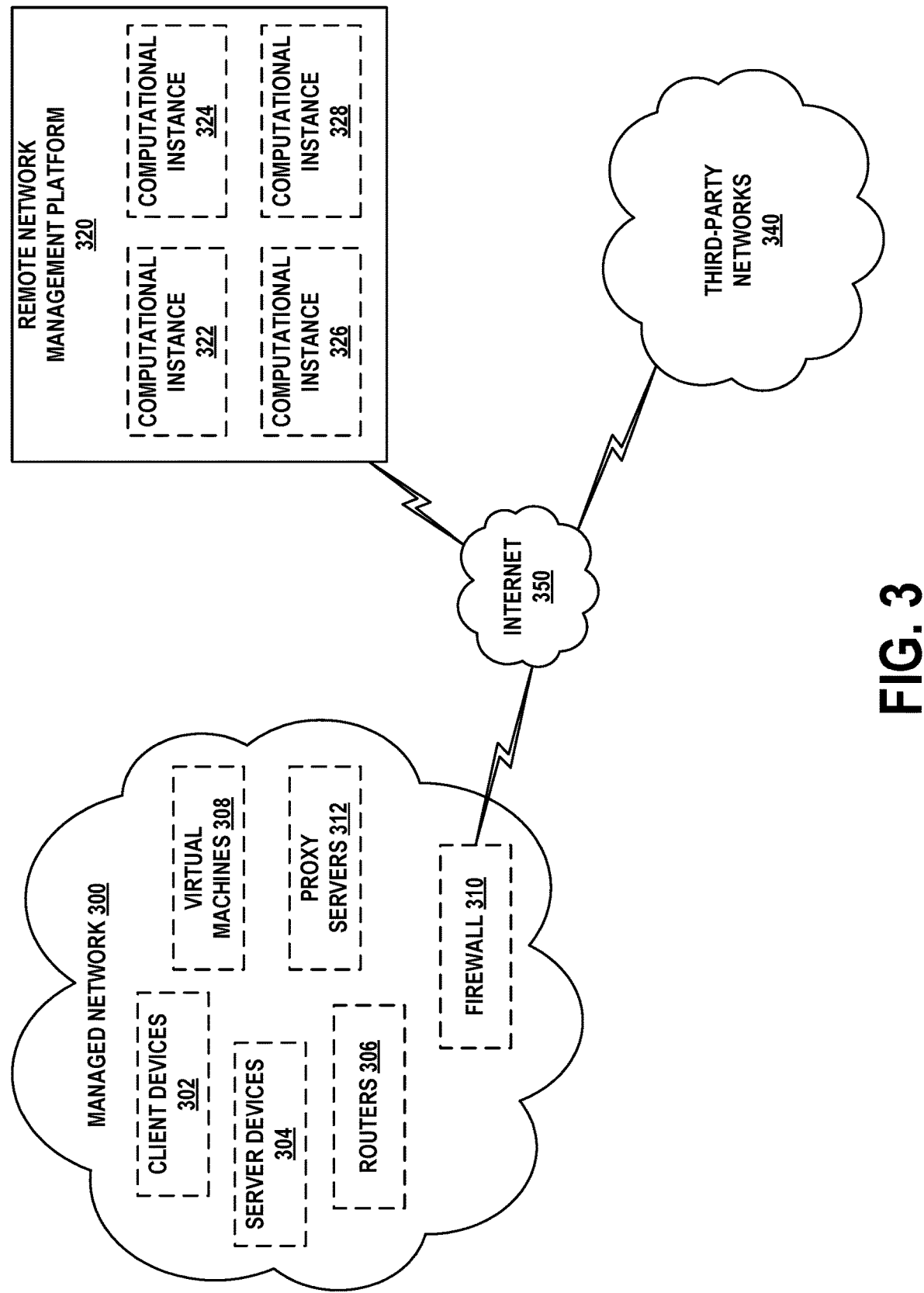
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
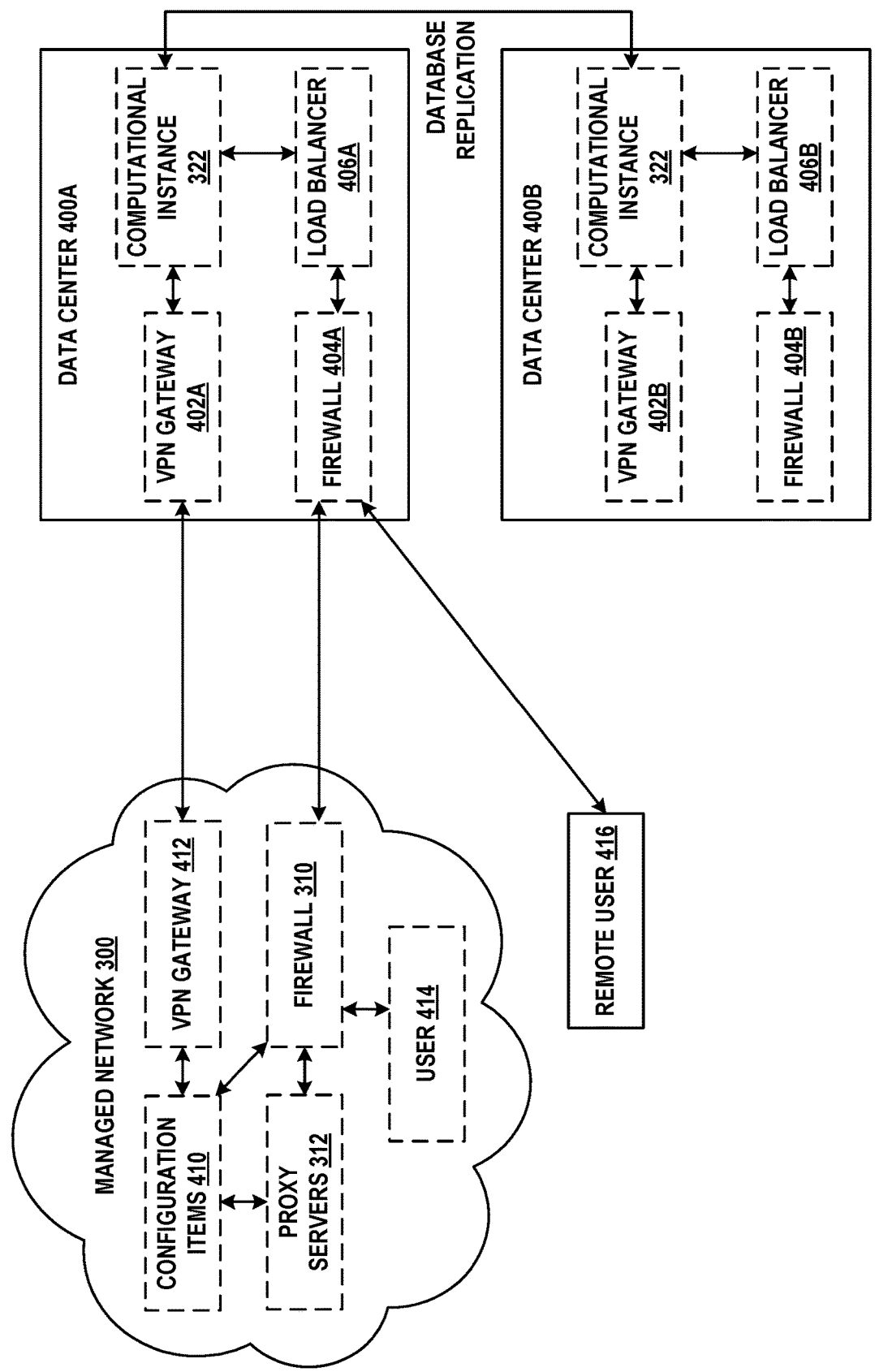
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
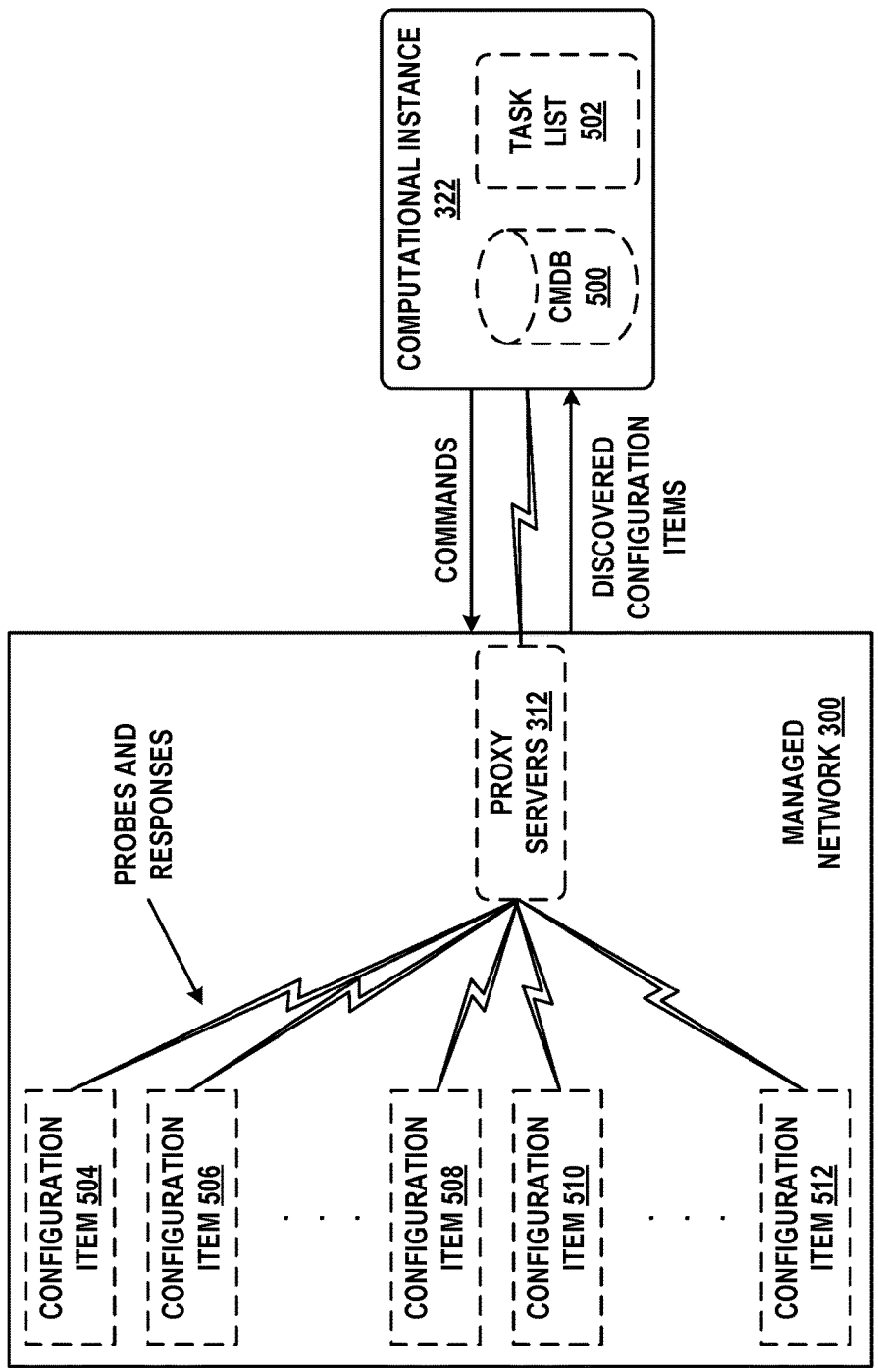
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
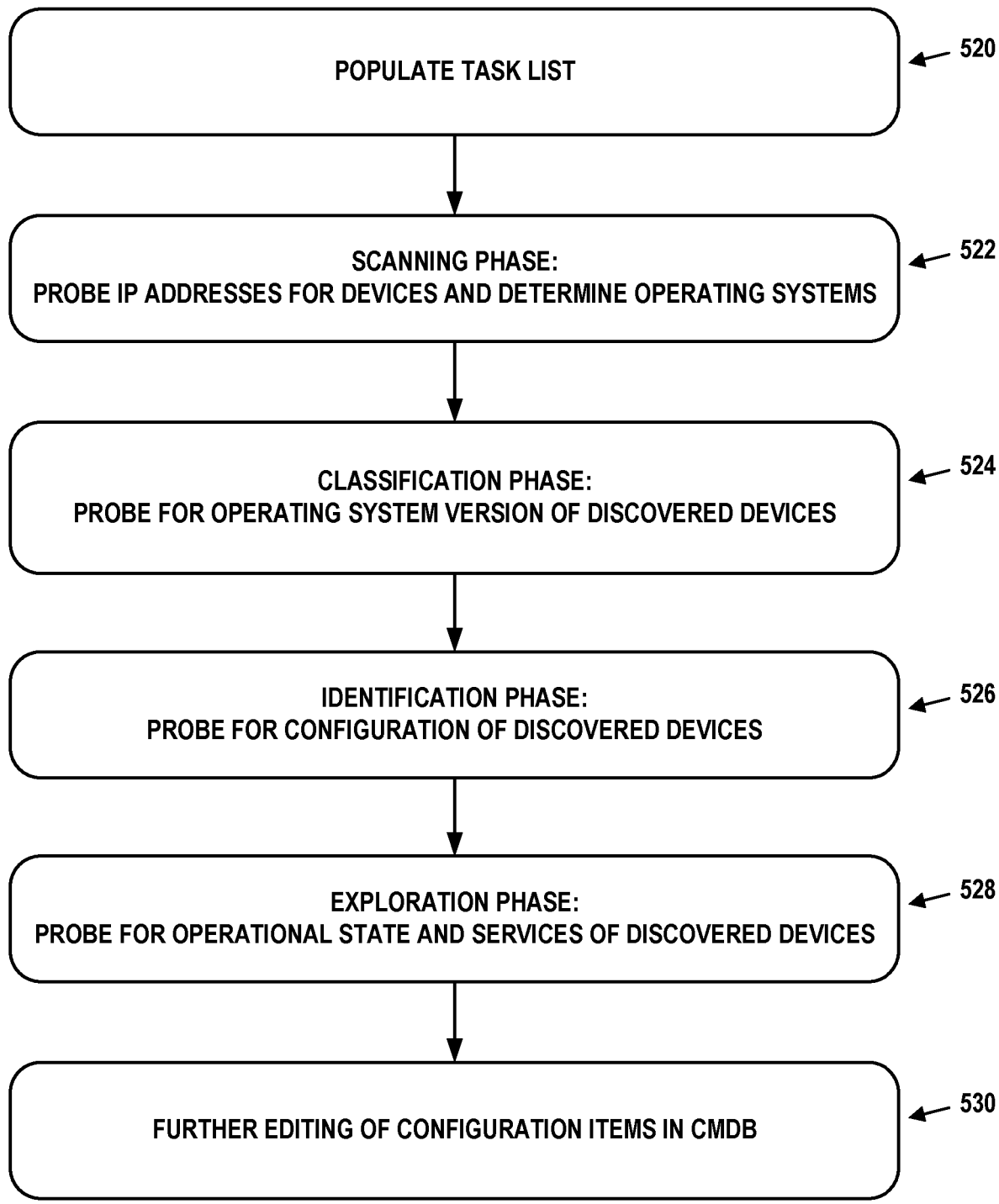
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Embedding and Bundling of Client-Side Scripts

Client-side scripts are programs stored on a server device (such as a web server device), and delivered to a client device for execution thereon (often in a web browser). References to client-side scripts (e.g., URLs) can be embedded in HTML or other markup languages. When a web client application (hereafter "web client") downloads HTML, it may scan the HTML for scripts. For each script that it identifies, the web client may request this script from the server device. Once the script arrives at the web client, the web client can execute the script. Through the use of scripts, web pages can be dynamic (herein the term "web application" or "web app" refers a web page with at least some dynamic components). In particular, client-side scripts allow web applications to be immediately reactive to user input often without requiring more information from the web server and any associated delays. For example, scripts may be used to change the layout of a displayed web application based on user input.

An example HTML file with embedded client-side scripts is shown below. In substance, the HTML includes references to two JavaScript scripts, module1.js and module2.js. A web client receiving this HTML file would determine that these references exist, and then request module1.js and module2.js by way of their respective URLs. Module1.js and module2.js may be implemented as individual files. In most cases, the web client would not be able to fully execute or display the web application until both of these scripts are retrieved and executed.

```
<html>
    <head>
        <meta charset="utf-8">
        <title>Example Website</title>
    </head>
    <body>
        <script src="https://www.example.com/module1.js" type="text/javascript"></script>
        <script src="https://www.example.com/module2.js" type="text/javascript"></script>
    </body>
</html>
```

It is not uncommon for modern web applications to refer to dozens, or even hundreds, of scripts in this fashion. As such, the serial retrieval and execution of these scripts can significantly delay the appearance of the rendered web application in the web client. This can lead to user frustration.

A script bundler, which can be software operating in a development environment, may be configured to combine two or more of such modules referenced by a web application into bundles. Advantageously, the bundler can automatically identify dependencies, such as libraries and imported files, and include these in the appropriate bundle. For instance, if module1.js depends on (e.g., calls functions in) core.js, a bundle could include module1.js, module2.js, and core.js. In some cases, all modules are placed in a single bundle (e.g., bundle.js). In other cases, the modules are split across more than one bundle. Regardless, the HTML may be updated to refer to the bundle(s) (e.g., bundle.js) rather than the individual modules.

An example of a bundler commonly used for JavaScript is WEBPACK®. A bundler may also be configured to group together specific static resources (e.g., image files and cascading style sheet (CSS) definitions) to take advantage of client device and/or web client caching. Moreover, a bundle can also be configured with a "minification" process which removes any characters that do not contribute to the functionality of the bundle, such as whitespace, comments, and newline characters. Minification can reduce the overall size of the bundle without changing the functionality of the code inside the bundle.

Bundling typically occurs at build time (e.g., when the web application is designed and bundled) rather than at run time (e.g., when the web application is requested and delivered to the web client). As such, run time latency is reduced, as only a small number of pre-packaged bundles are delivered to the web client. But these pre-packaged bundles need to be able to operate together in order for the web application to execute properly. Furthermore, both techniques (delivering scripts one at a time and bundling) can be inefficient when multiple modules depend on the same modules for their proper operation.

As an example, suppose that both module1.js and module2.js depend on core.js. The core.js file may be a library containing functions called by both module1.js and module2.js. But suppose further that each of module1.js and module2.js is developed by or under the control of different developers, teams, or organizations, and therefore are bundled separately. This is common for large web application development projects where it is advantageous for these entities to develop standalone modules independently from one another.

A naïve bundling solution may attempt to take these dependencies into account by bundling (at build time) a copy of core.js with each module that depends on it. Thus, one entity would bundle module1.js with core.js to form bundle1.js, and the other entity would bundle module2.js with core.js to form bundle2.js. The HTML would be updated to refer to both bundle1.js and bundle2.js. But, this would result in two copies of core.js being delivered to the web client when the web application is processed, one for module1.js and the other for module2.js.

Despite its advantages to developers, such behavior is inefficient and undesirable for end users of the web application. Not only will it take longer for the web client to retrieve both bundles (due to the two copies of core.js), but memory on both the web server and the web client will be wasted while storing the extra copy of core.js. Therefore, more efficient bundling embodiments are desirable, and will be explained in detail below with more involved examples.

A. Bundling Using Module Dependency Graphs

Figure 6A:
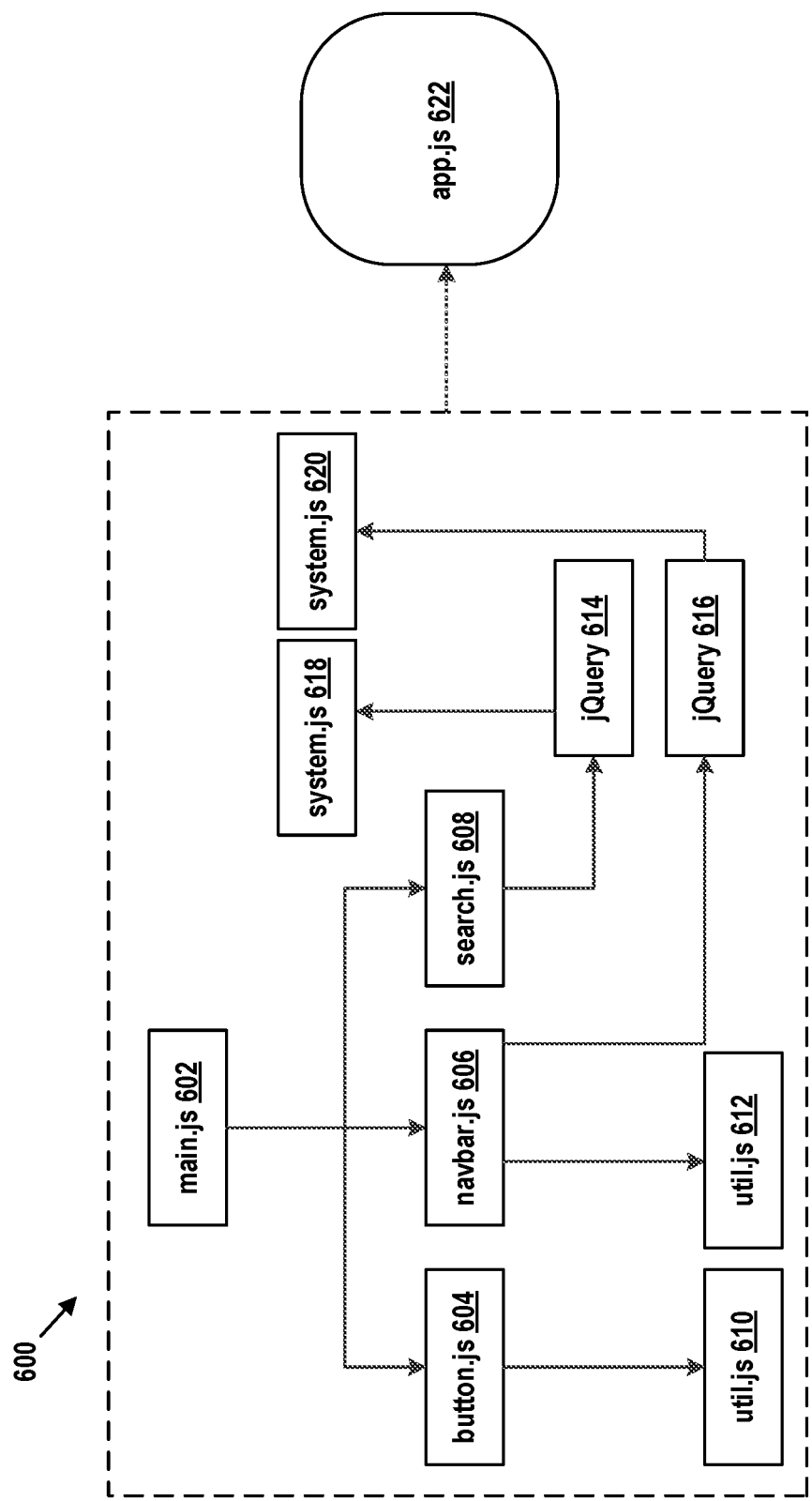
FIG. 6A depicts a web application module dependency graph, in accordance with example embodiments.

FIG. 6A shows dependency graph 600 for a web application. Dependency graph 600 includes main.js module 602, which serves as the root (e.g., the entry point of the code). Unless stated otherwise, an arrow pointing from a first module to a second module (e.g., from main.js module 602 to button.js module 604) indicates that the first module has a dependency on the second module. Thus, the first module includes, imports, or otherwise requires the presence of the second module in order to operate properly.

In FIG. 6A, main.js module 602 depends on three other modules, button.js module 604, navbar.js module 606, and search.js module 608 (these modules may represent GUI widgets for a clickable button, a navigation bar, and a search box, for example). Further, buttonjs module 604 requires util.js module 610, navbar.js module 606 requires util.js module 612 and jQuery module 616, and search.js module 608 requires jQuery module 614. jQuery module 614 requires system.js module 618, and jQuery module 616 requires system.js module 620.

Note that jQuery module 614 and jQuery module 616 contain the exact same information, but are referenced as dependencies by two different modules (search.js module 608 and navbar.js module 606, respectively). Similarly, system.js module 618 and system.js module 620 are copies of the same information. Also, util.js module 610 and util.js module 612 are also copies of the same information. Thus, a total of six additional modules are required by the web client to execute main.js module 602, three of which are redundant. As a web application gets more complex, dependency graph 600 can grow larger and the number of redundant modules may increase.

As noted above, a bundler may analyze the dependency relationships within script modules referenced by a web application and automatically combine these modules into one or more bundles. In practice, this means that a bundle can combine modules that were originally disposed within multiple files into a single file. For example, app.js bundle 622 can be in the form of a single file that resolves all dependencies from graph 600 (the dotted arrow from graph 600 to app.js bundle 622 indicates that app.js bundle 622 is a combination of the modules in graph 600, rather than a dependency—other dotted arrows in the figures have a similar meaning unless defined differently).

As a result of analyzing these dependencies, the bundler may include, in app.js bundle 622, all dependencies specified in dependency graph 600. This would mean that two copies of the util.js, JQuery, and system.js modules would be included. On the other hand, dependency graph 600 can be improved or optimized so that there are no redundant dependencies. For example, button.js module 604 and navbar.js module 606 can be made to both depend on util.js module 610, and navbar.js module 606 and search.js module 608 can be made to both depend on jQuery module 614. In this way, after analyzing the dependencies, the bundler may include only one copy of each redundant module in the bundle (e.g., util.js module 612, jQuery module 616, and system.js 620 can be omitted). Thus, with an efficient dependency graph, a bundler can resolve complex relationships between modules and reduce the number of files that a web client loads after requesting a web application.

Available bundlers are designed under the assumption that bundles are created using such a single dependency graph. But the resulting single bundle can be excessively large and may slow initial load times when delivered to a web application. Further, in a distributed development environment, bundling all modules into a single file may require cross-developer or cross-team coordination that is difficult to maintain in practice. Thus, it is desirable to be able place modules into bundles based on the logical relationships between the modules and/or the organizational relationships between developers.

Therefore, a bundler may be configured to create multiple bundles from modules represented by a dependency graph. While various arrangements and numbers of bundles can be derived from any non-trivial dependency graph, not all arrangements of modules into bundles are efficient or effective.

Figure 6B:
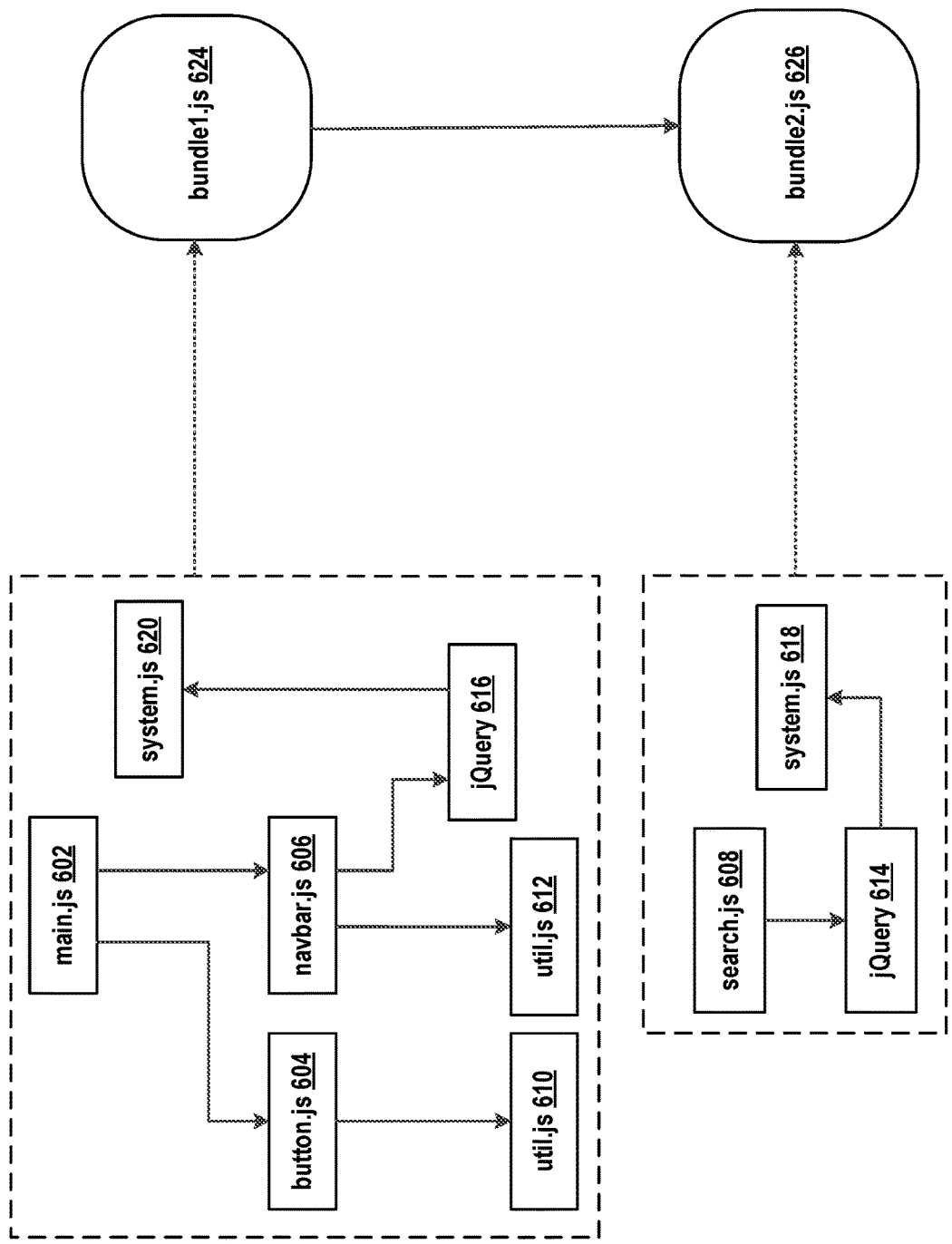
FIG. 6B depicts the modules of FIG. 6A combined into two bundles, in accordance with example embodiments.

For example, FIG. 6B shows one possible example of multiple bundles generated from dependency graph 600. Bundle2.js 626 contains a portion of the web application, namely the search functionality. Bundle1.js 624 contains the remaining portion of the web application. Bundle1.js 624 has a dependency on bundle2.js 626, which is the only dependency in the relationship between the modules of the original dependency graph 600.

This arrangement may reflect a situation in which one developer or team is responsible for main.js module 602, button.js module 604, and navbar.js module 606, and another developer or team is responsible for search.js module 618. Each team is also responsible for determining any dependencies on libraries or common modules. Thus, dependencies to util.js, jQuery, and system.js are shown in FIG. 6B where appropriate. Alternatively, FIG. 6B may reflect a situation where a single developer is attempting to logically organized a set of interdependent modules.

However, bundle1.js 624 and bundle2.js 626 still contain redundant files, namely util.js module 610 and util.js module 612, jQuery module 614 and jQuery module 616, and system.js module 618 and system.js module 620. Thus, the arrangement of FIG. 6B still results in excess memory utilization on both the web server device and in the client device executing the web client due to these redundancies. Also, transferring this redundant information to the web client unnecessarily increases latency. For example, each copy of jQuery might be 75 kilobytes or more in size.

Figure 6C:
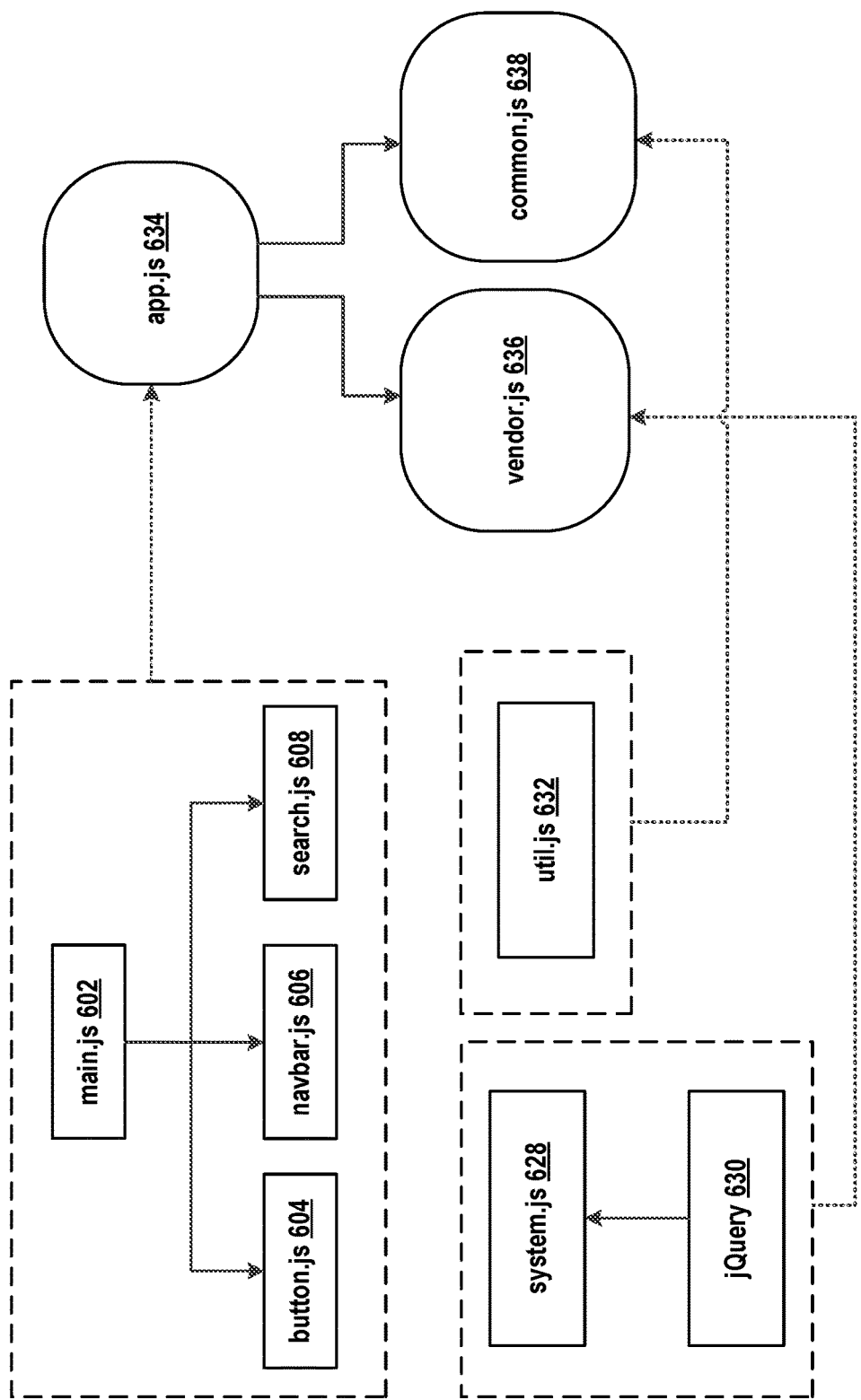
FIG. 6C depicts the modules of FIG. 6A combined into three bundles, in accordance with example embodiments.

FIG. 6C shows how a bundler may be configured to reduce redundant modules. A bundler could scan dependency graph 600 to discover duplicate files, and then organize bundles with single representations of shared modules. As shown, there is only one copy of each of system.js module 628, jQuery module 630, and util.js module 632. The single representations of the shared modules are then bundled into vendor.js bundle 636 and common.js bundle 638. The remaining modules are bundled into app.js bundle 634. When delivered to a web client, app.js bundle 634 has only two dependencies. Furthermore, the size of each bundle is now smaller, as redundant files have been eliminated.

But the mapping of modules to bundles in FIG. 6C has disadvantages as well. A goal of web application development is to be able to mix and match different combinations of web components represented by these modules in an HTML file. Thus, it is desirable for each of button.js module 604, navbar.js module 606, and search.js module 608 to be bundled with their dependencies as individual, reusable web components. In this fashion, a web application designer can refer to these modules in an HTML file without having to be aware of these dependencies. Furthermore, the arrangement of FIG. 6C does not easily support a distributed development process where different developers or teams are responsible for different modules.

B. Bundling with Distributed Development

A distributed development system allows more than one developer to independently create software applications. Such a system may be found in an enterprise, where software applications may be developed by individual departments within the enterprise. Such applications could include or take the form of web applications or distinct components of web applications. In some cases, a web component could be associated to with a particular GUI widget, such as a button, navigation bar, or search bar. Then, a web developer could use these different independent components to compose a web application.

For sake of clarity, a web component herein may refer to a bundle that represents a particular set of web application functionality, and may include one or more modules. As noted above, each of button.js module 604 and its dependencies, navbar.js module 606 and its dependencies, and search.js module 608 and its dependencies could be bundled as separate web components.

Figure 7:
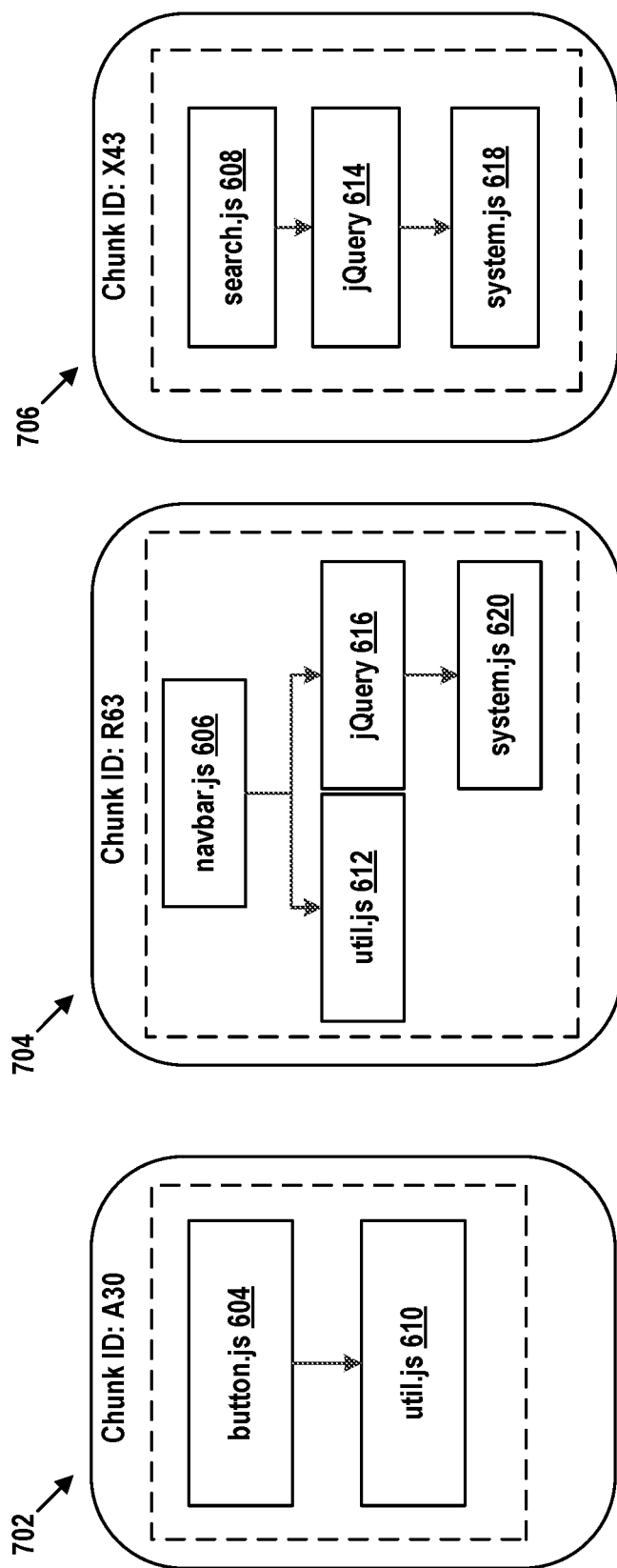
FIG. 7 depicts distributed builds resulting in bundles with unique identifiers, in accordance with example embodiments.

To that point, FIG. 7 depicts these modules as separate and distinct web components in the form of bundles. As discussed above, the process of bundling modules may be referred to as "creating a build," and the resulting bundle(s) may be referred to as a "build." Alternatively or additionally, a build can be defined as one or more bundles that make up at least part of a useable web component.

In FIG. 7, build 702 contains a bundle of modules that provide a standalone button web component, build 704 contains a bundle of modules that provide a standalone navigation bar web component, and build 706 contains a bundle of modules that provide a standalone search box web component. Each of these builds includes a single bundle, but as noted multiple bundles per build are possible.

Each bundle is referred to by a chunk ID, an identifier that is determined internally to the bundler during the build process. Particularly, build 702 is referred to by chunk ID A30, build 704 is referred to by chunk ID R63, and build 706 is referred to by chunk ID X43. While the chunk IDs used for illustration herein each consist of a letter followed by a two-digit number, chunk IDs can take other forms. For example, a chunk ID can be an alphanumeric or binary string of arbitrary length.

Each chunk ID may be assigned uniquely in each build, but can vary between builds. For instance, if build 702 is built by two different computing devices, or at two different times by the same computing device, its chunk ID can be different. In some embodiments, each module is also individually referred to with a module ID that is also unique per build in the same general fashion. In some cases, module IDs and chunk IDs may be used interchangeably.

Since each build in FIG. 7 is independent of the other builds and there are no cross-build dependencies, each of the button web component, navigation bar web component, and search box web component can be designed and developed by different developers or teams. Then, these bundles may be combined to create web applications and/or web application components. For instance, an HTML file may contain links to button.js module 604, navbar.js 606, and search.js module 608 in any order and arrangement.

However, while the distinct builds of FIG. 7 resolve difficulties experienced web component and web application developers, it reintroduces the inefficiency of providing redundant copies of modules to the web client during run time. Namely, util.js module 610 and util.js module 612, are provided to the web client whenever button.js module 604 and navbar.js 606 are both referenced in an HTML file. Likewise, jQuery module 614 and jQuery module 616, as well as system.js module 618 and system.js module 620, are provided to the web client whenever navbar.js 606 and search.js module 608 are both referenced in an HTML file.

Figure 8:
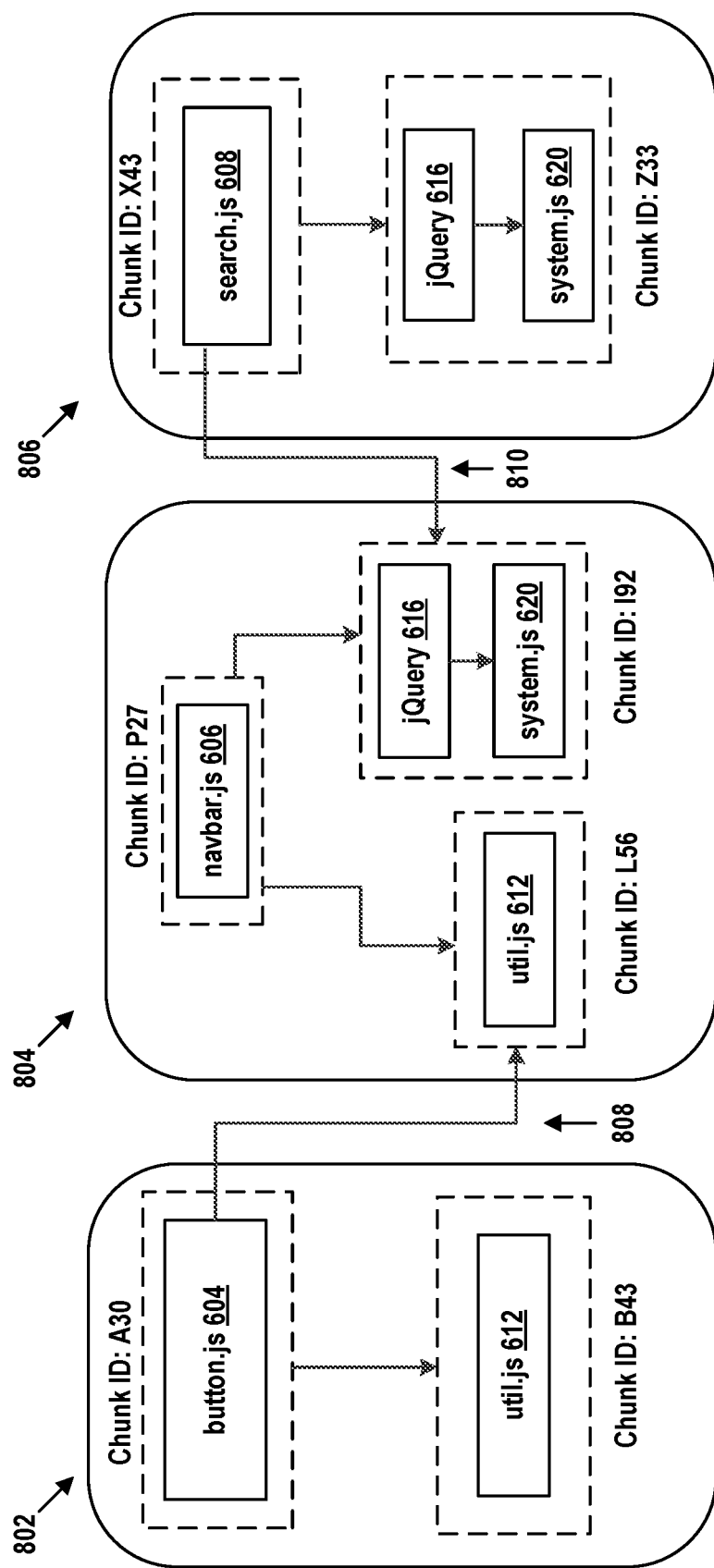
FIG. 8 depicts using multiple unique identifiers per build, in accordance with example embodiments.

One way of identifying cross-build dependencies is shown in FIG. 8. Similar to the builds of FIG. 7, build 802 contains modules for a button, build 804 contains modules for a navigation bar, and build 806 contains modules for a search bar. But unlike the builds of FIG. 7, multiple chunk IDs are used within each build in order to further differentiate between bundles of modules. In the scenarios depicted herein, a chunk ID may have a one-to-one relationship with a bundle, though it is possible for bundles to include more than one chunk ID.

Build 802 contains two chunk IDs, chunk ID A30 for button.js module 604 and chunk ID B43 for util.js module 612. The dependencies between these modules carry over to their chunk IDs, so chunk ID A30 depends on chunk ID B43. Build 804 contains three chunk IDs, chunk ID P27 for navbar.js module 606, chunk IDs L56 for util.js module 612, and chunk ID 192 for the combination of jQuery module 616 and system.js module 620. Chunk ID P27 depends on chunk IDs L56 and 192. Build 806 contains two chunk IDs, chunk ID X43 for search.js and chunk ID Z33 for the combination of jQuery module 616 and system.js module 620. Chunk ID X43 depends on chunk ID Z33.

Resolving the dependencies across builds is challenging, however, as the chunk IDs generated in each build process are configured independently and can vary from machine to machine. For example, chunk IDs 192 and Z33 contain identical content, but occur in separate builds. As a result, chunk P27 would use chunk ID 192 to resolve a dependency on jQuery module 616, and chunk ID X43 would use chunk ID Z33 to resolve a dependency on jQuery module 616. Thus, in order to reference chunks in other builds, the build process for one build would need to know about the chunk IDs in another build.

Thus, the build process may identify further cross-build dependencies that can be leveraged to reduce the overall number of bundles that are provided to a web client. For example, the build process may determine that chunk ID A30 could potentially depend on chunk ID L56 instead of chunk ID B43, because chunk ID L56 contains the same module as chunk ID B43. This cross-dependency is represented with arrow 808. Further, the build process may determine that chunk ID X43 could potentially depend on chunk ID 192 instead of chunk ID Z33, because chunk ID 192 contains the same modules as chunk ID Z33. This cross-dependency is represented with arrow 810.

At run time, the web server may use these cross-dependencies to reduce the number of modules delivered to a web client. Instead of delivering multiple copies of util.js module 612, jQuery module 616, and system.js 620, the web server may use the identified cross-dependencies to provide only one copy of each. But this approach has a drawback—the build process would need access to all bundles in order to efficiently manage dependencies. And since builds can happen in a distributed fashion (due to multiple developers working on a web application), it would be cumbersome provide this access. Additionally, the chunk IDs can change between two different builds of the same bundle, further complicating the process.

C. Bundling with Deterministic Identifiers

As a more favorable alternative, the build software can be configured to generate deterministic chunk IDs for at least some modules. This allows cross-bundle dependencies to be more easily identified and maintained. To that point, FIG. 9 illustrates distributed builds configured to use deterministic identifiers to recognize and resolve cross-dependencies.

Figure 9:
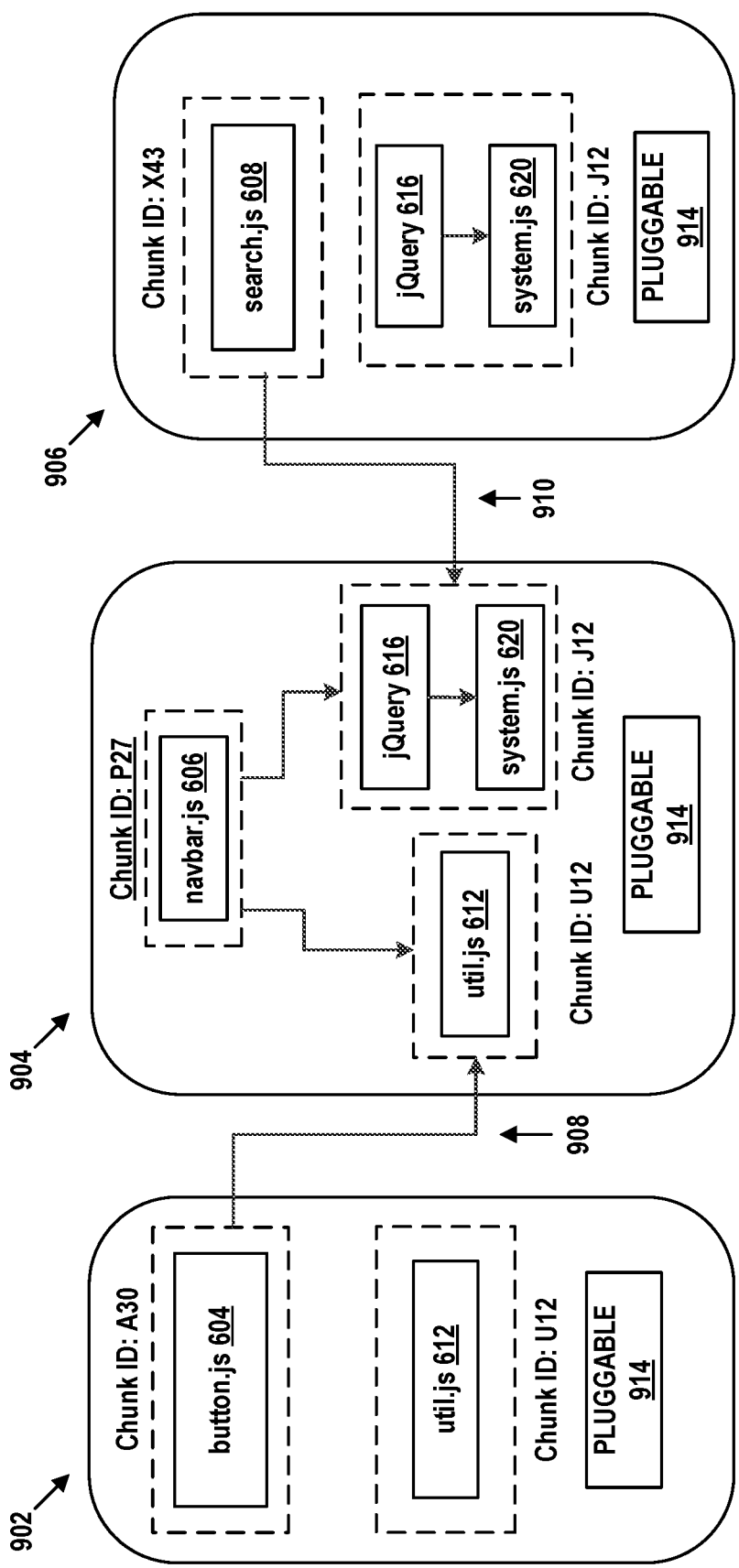
FIG. 9 depicts using deterministic identifiers within a build, in accordance with example embodiments.

Similar to FIGS. 7 and 8, FIG. 9 includes three builds 902, 904, and 906. Build 902 contains modules for a button, build 904 contains modules for a navigation bar, and build 906 contains modules for a search bar. In addition, each build contains a pluggable component 914 that is configured to be part of the build process.

As the build process generates bundles, pluggable component 914 is configured to assign the same chunk ID to identical modules and/or bundles across the builds. Thus, pluggable component 914 may be a unit of software added to a bundler in order to modify the bundler's default operation. Pluggable component 914 is shown "inside" of each build in FIG. 9 in order to represent its contribution to the builds. As noted above, pluggable component 914 may be part of the build software and might not explicitly be represented in each build.

In build 902, pluggable component 914 assigns util.js module 612 the chunk ID U12, and in bundle 904, pluggable component 914 also assigns util.js module 612 the chunk ID U12. At run time, both chunk ID A30 and chunk ID P27 would use chunk ID U12 to resolve their dependencies on util.js module 612. Similarly, in build 904, pluggable component 914 assigns the combination of jQuery module 616 and system.js module 620 the chunk ID J12, and in bundle 906, pluggable component 914 also assigns the combination of jQuery module 616 and system.js module 620 the chunk ID J12. At run time, both chunk ID P27 and chunk ID X43 would use chunk ID J12 to resolve their dependencies on jQuery module 616 and system.js module 620. This allows modules from separate builds to be able to be efficiently combined with one another.

For example, if build 902 is transmitted to the web client first, the presence of chunk IDs A30 and U12 may be taken into account when transmitting builds 904 and 906 to the web client. Thus, chunk ID U12 may be omitted from build 904 when build 904 is transmitted to the web client. Similarly, since build 904 contains chunk ID J12, this chunk ID may be omitted from build 906 when build 906 is transmitted to the web client.

As noted above, each chunk can contain multiple modules, and these modules can also be assigned deterministic module IDs. In cases where a chunk contains a single module, the chunk ID may serve as the module ID.

To carry out the deterministic assignments, pluggable component 914 may have access to a configuration file, configuration settings, or similar mechanism that defines which modules and chunks are to be assigned deterministic IDs and/or the general format of these IDs. While all modules and chunks can be assigned deterministic IDs, in practice this is often not necessary. For example, in FIG. 9, the chunk ID J12 contains jQuery module 616 and system.js module 620. But none of the other modules call system.js module 620 directly. Instead, they call jQuery module 616 which in turn calls system.js module 620. Therefore, jQuery module 616 should be assigned a deterministic module ID, but system.js module 620 could be assigned a non-deterministic module ID.

As to the format of the chunk and module IDs, any mechanism that produces deterministic IDs can be suitable. In some embodiments, modules IDs are assigned based on the module name and version number. For example, version 1.2 of the util.js module 612 could be assigned the module ID "util.js-1.2". In this way, dependencies on certain versions of modules can be properly maintained. In other situations, where the version of the module is not important, only the module name ("util.js") might be used as the module ID. Deterministic chunk IDs can be generated based on the names of one or more modules within the associated chunk. For example, the chunk with the chunk ID of J12 could be assigned a deterministic ID of "jQuery-system.js" or just "jQuery". Other possibilities exist—for example, if there is only one module in a chunk, the module ID can serve as the chunk ID or vice-versa.

Figure 10:
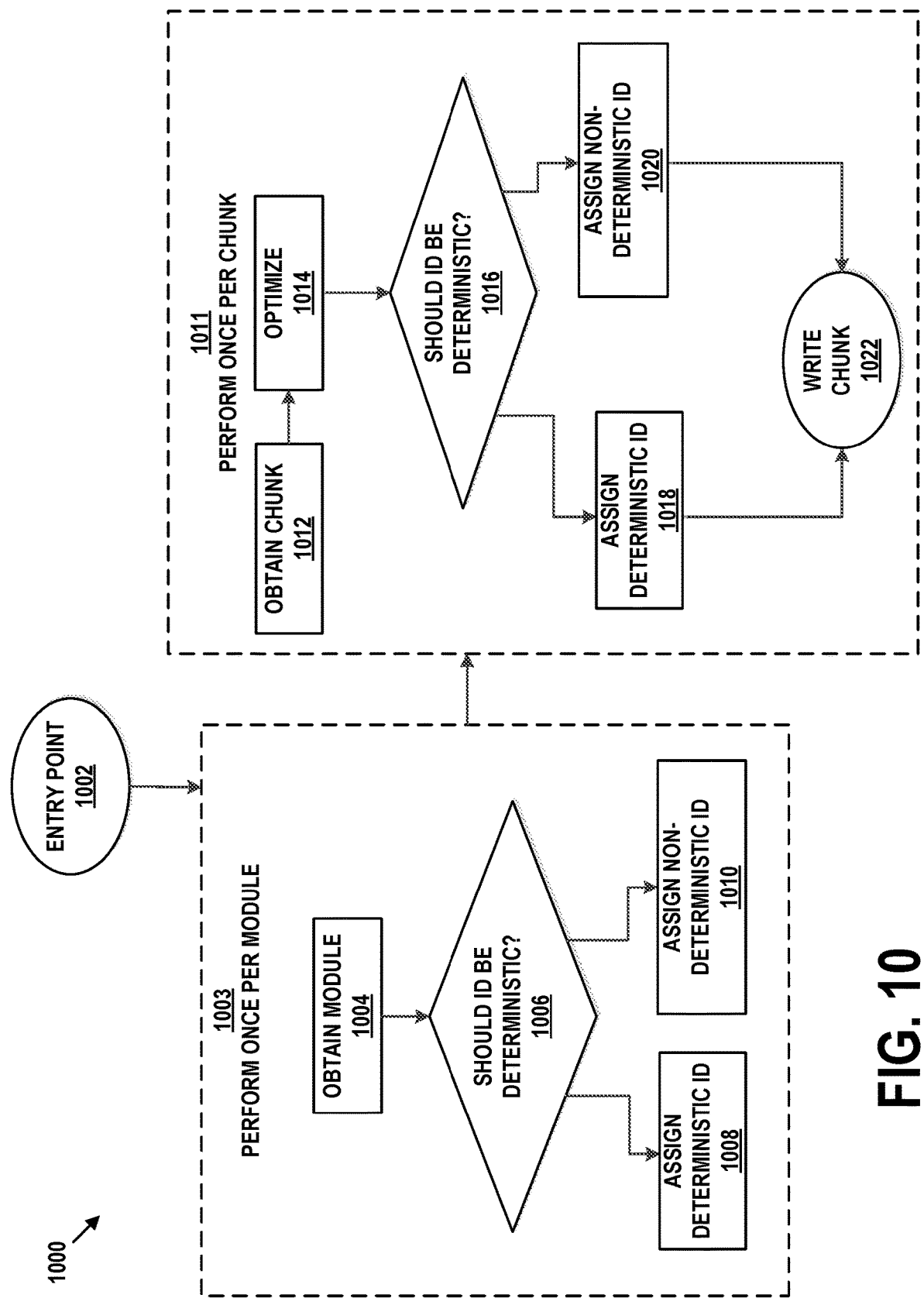
FIG. 10 is a flow chart, in accordance with example embodiments.

FIG. 10 illustrates the process of assigning deterministic module IDs and chunk IDs as flow chart 1000. Starting at entry point 1002, the bundler performs the operations of section 1003 for each module. At step 1004, the bundler obtains the module. At step 1006, the bundler determines whether the module ID for this module should be deterministic. For example, a configuration file may specify one or more modules that should be assigned deterministic module IDs. If the module is to be assigned a deterministic ID, this is done at step 1008. If the module is not to be assigned a deterministic ID, the module is assigned a non-deterministic ID at step 1010.

Once module IDs are assigned to each module in the bundle, the bundler performs the operations of section 1011 for each chunk in the bundle. At step 1012, the bundler obtains the chunk. At step 1014, the bundler "optimizes" the chunk. This may involve the minification described above. At step 1016 the bundler determines whether the chunk ID for this chunk should be deterministic. As was the case for modules, a configuration file may specify one or more chunks that should be assigned deterministic chunk IDs. If the chunk is to be assigned a deterministic ID, this is done at step 1018. If the chunk is not to be assigned a deterministic ID, the chunk is assigned a non-deterministic ID at step 1020. Regardless, the chunk is written to memory (e.g., as a file containing bundle) at step 1022.

VI. Example Operations

Figure 11:
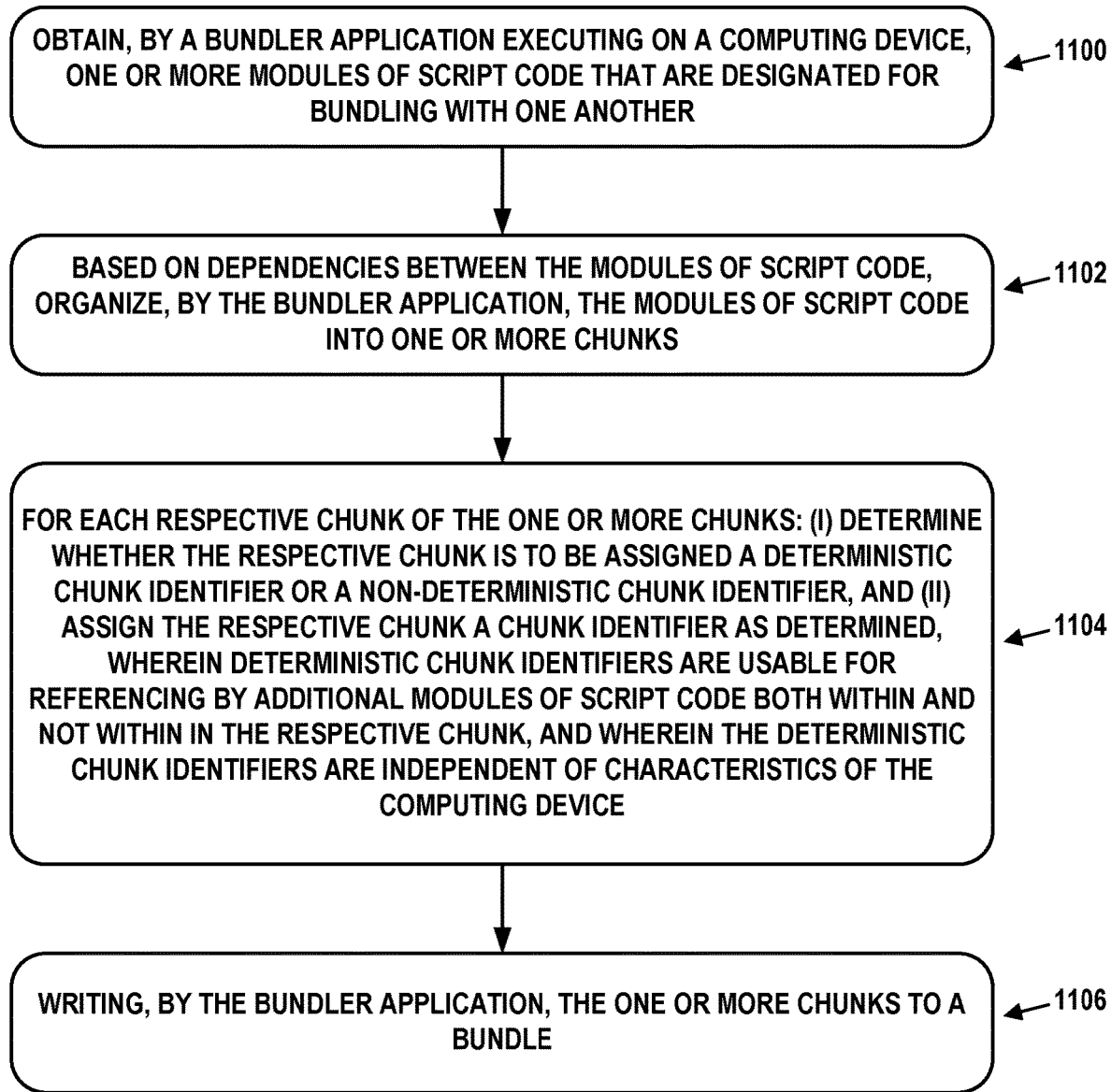
FIG. 11 is a flow chart, in accordance with example embodiments.

FIG. 11 is a flow chart illustrating an example embodiment. The process illustrated by FIG. 11 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 11 may be simplified by the removal of any one or more of the features shown therein. Further, these embodiments may be combined with features, aspects, and/or implementations of any of the previous figures or otherwise described herein.

Block 1100 may involve obtaining, by a bundler application executing on a computing device, one or more modules of script code that are designated for bundling with one another.

Block 1102 may involve, possibly based on dependencies between the modules of script code, organizing, by the bundler application, the modules of script code into one or more chunks Block 1104 may involve, for each respective chunk of the one or more chunks, the bundler application: (i) determining whether the respective chunk is to be assigned a deterministic chunk identifier or a non-deterministic chunk identifier, and (ii) assigning the respective chunk a chunk identifier as determined. Deterministic chunk identifiers may be usable for referencing by additional modules of script code both within and not within in the respective chunk, and the deterministic chunk identifiers may be independent of characteristics of the computing device.

Block 1106 may involve writing, by the bundler application, the one or more chunks to a bundle.

In some embodiments, a server device has access to the bundle and an additional bundle, where both the bundle and the additional bundle contain a particular chunk with a particular deterministic chunk identifier. Additional operations may involve, possibly based on presence of the particular deterministic chunk identifier, providing no more than one copy of the particular chunk to a web client when the web client requests both the bundle and the additional bundle.

In some embodiments, the modules of script code are JavaScript modules.

In some embodiments, determining whether the respective chunk is to be assigned the deterministic chunk identifier or the non-deterministic chunk identifier comprises: reading, from configuration settings, dependency information related to the respective chunk; and assigning the deterministic chunk identifier or the non-deterministic chunk identifier based on the dependency information related to the respective chunk.

In some embodiments, the respective chunk is assigned the deterministic chunk identifier, and the deterministic chunk identifier includes a module name of a particular module of script code within the respective chunk. The deterministic chunk identifier may also include a module version of the particular module of script code.

In some embodiments, the respective chunk contains exactly one module of script code. In some embodiments, the modules of script code are organized into exactly one chunk.

Further operations may involve, for each respective module of the one or more of the modules of script code: (i) determining whether the respective module is to be assigned a deterministic module identifier or a non-deterministic module identifier, and (ii) assigning the respective module a module identifier as determined. Deterministic module identifiers may be usable for referencing by additional modules of script code both within and not within in the respective module, and may be independent of characteristics of the computing device. The respective module may be assigned the deterministic module identifier, and the deterministic module identifier may include a module name of the respective module. The deterministic module identifier may also include a module version of the respective module.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method, comprising:
    determining dependency information for a plurality of modules, wherein each of the plurality of modules comprises script code;
    organizing the plurality of modules into a plurality of chunks based at least in part on the dependency information of the plurality of modules;
    for each chunk of the plurality of chunks:
        determining whether the chunk should be assigned a deterministic chunk identifier (ID) or a non-deterministic chunk ID based at least in part on the dependency information of the plurality of modules;

in response to determining that the chunk should be assigned the deterministic chunk ID, assigning the chunk the deterministic chunk ID; and in response to determining that the chunk should be assigned the non-deterministic chunk ID, assigning the chunk the non-deterministic chunk ID;

creating a first bundle by combining a first portion of the plurality of chunks based at least in part on the dependency information of the plurality of modules; and creating a second bundle by combining a second portion of the plurality of chunks based at least in part on the dependency information of the plurality of modules.

2. The method of claim 1, comprising receiving, from a web client, a request for the first bundle, and, in response, providing the first bundle to the web client.

3. The method of claim 2, wherein the request received from the web client also requests the second bundle, and wherein the method comprises:

determining that the first bundle and the second bundle both include a particular chunk having the same deterministic chunk ID; and providing the second bundle to the web client without providing the particular chunk as part of the second bundle.

4. The method of claim 1, wherein assigning the chunk the deterministic chunk ID comprises generating the deterministic chunk ID based on a combination of names of one or more modules of the chunk, or versions of the one or more modules of the chunk, or any combination thereof.

5. The method of claim 1, comprising:

for each module of the plurality of modules:

determining whether the module should be assigned a deterministic module identifier (ID) based on the dependency information of the module;

in response to determining that the module should be assigned the deterministic module ID, assigning the module the deterministic module ID; and in response to determining that the module should be assigned a non-deterministic module ID, assigning the module the non-deterministic module ID.

6. The method of claim 1, comprising:

for each chunk of the plurality of chunks:

performing minification of the chunk before determining whether the chunk should be assigned the deterministic ID, wherein minification reduces an overall size of the chunk without changing functionality of the one or more modules of the chunk.

7. The method of claim 6, wherein performing minification comprises removing characters that do not contribute to the functionality of the modules of the chunk, wherein the characters comprise whitespace, comments, newline characters, or a combination thereof.

8. The method of claim 1, wherein determining the dependency information for the plurality of modules comprises accessing a configuration file to determine the dependency information for the plurality of modules.

9. The method of claim 1, wherein each of the plurality of modules comprises a JavaScript module.

10. The method of claim 1, wherein creating the first bundle comprises:

bundling, along with the first portion of the plurality of chunks, one or more static resources referenced by the first portion of the plurality of chunks to create the first bundle, wherein the static resources comprise image files, cascading style sheet (CSS) definitions, or a combination thereof.

11. A system comprising:

a memory configured to store a plurality of bundles, wherein the plurality of bundles includes:

a first bundle having a first chunk with a first deterministic chunk identifier (ID);

a second bundle having a second chunk with a second deterministic chunk ID;

a processor configured to execute instructions to cause the system to perform action comprising:

receiving, from a web client, a request for both the first bundle and the second bundle;

comparing the first deterministic chunk ID and the second deterministic chunk ID;

in response to determining that the first deterministic chunk ID and the second deterministic chunk ID are different, providing, to the web client, the first bundle and the second bundle; and in response to determining that the first deterministic chunk ID and the second deterministic chunk ID are the same, providing, to the web client, the first bundle and the second bundle without providing the second chunk as part of the second bundle.

12. The system of claim 11, wherein the processor is configured to execute the instructions to cause the system to perform action comprising:

determining dependency information for a plurality of modules, wherein each of the plurality of modules comprise script code;

organizing the plurality of modules into a plurality of chunks based at least in part on the dependency information of the plurality of modules;

for each chunk of the plurality of chunks:

determining whether the chunk should be assigned a deterministic chunk identifier (ID) or a non-deterministic chunk ID based at least in part on the dependency information of the plurality of modules;

in response to determining that the chunk should be assigned the deterministic chunk ID, assigning the chunk the deterministic chunk ID; and in response to determining that the chunk should be assigned the non-deterministic chunk ID, assigning the chunk the non-deterministic chunk ID;

creating the first bundle in the memory, wherein the first bundle comprises a first portion of the plurality of chunks, including the first chunk; and creating a second bundle in the memory, wherein the second bundle comprises a second portion of the plurality of chunks, including the second chunk.

13. The system of claim 11, wherein the first chunk contains a single script code module.

14. The system of claim 11, wherein the first bundle and the second bundle comprise additional chunks having respective non-deterministic chunk IDs.

15. The system of claim 11, wherein the second bundle includes a third chunk having a third deterministic chunk ID.

16. The system of claim 15, wherein a module of the first chunk of the first bundle is dependent on a module of the third chunk of the second bundle.

17. A non-transitory, computer-readable medium storing instructions executable by a processor of a computer system, the instructions comprising instructions to:

determine dependency information for a plurality of modules, wherein each of the plurality of modules comprise script code;

organize the plurality of modules into a plurality of chunks based at least in part on the dependency information of the plurality of modules;

for each chunk of the plurality of chunks:
- determine whether the chunk should be assigned a deterministic chunk identifier (ID) or a non-deterministic chunk ID based at least in part on the dependency information of the plurality of modules;
- in response to determining that the chunk should be assigned the deterministic chunk ID, assign the chunk the deterministic chunk ID; and
- in response to determining that the chunk should be assigned the non-deterministic chunk ID, assign the chunk the non-deterministic chunk ID;

create a first bundle by combining a first portion of the plurality of chunks based at least in part on the dependency information of the plurality of modules;

create a second bundle by combining a second portion of the plurality of chunks based at least in part on the dependency information of the plurality of modules;

receive, from a web client, a request for the first bundle; and in response to receiving the request, providing the first bundle to the web client.

18. The medium of claim 17, wherein the request received from the web client also requests the second bundle, and wherein the instructions comprise instructions to:
- determine that the first bundle and the second bundle both include a particular chunk having the same deterministic chunk ID, and in response, provide the second bundle to the web client without providing the particular chunk as part of the second bundle, and otherwise, provide the second bundle to the web client along with the first bundle.

19. The medium of claim 17, wherein the instructions to determine whether the chunk should be assigned the deterministic chunk ID comprise instructions to:
- determine that the chunk should be assigned the deterministic chunk ID when another chunk of the plurality of chunks is dependent on the chunk.

20. The medium of claim 17, wherein the instructions to determine whether the chunk should be assigned the deterministic chunk ID comprise instructions to:
- determine that the chunk should be assigned the deterministic chunk ID when the chunk is identical to another chunk of the plurality of chunks.

\* \* \* \* \*